3,252,808
METHOD OF PRODUCING A SALT COMPOSITION USEFUL IN PROCESSING MEAT
Louis Sair, Evergreen Park, and Carroll L. Griffith, Chicago, Ill., assignors to The Griffith Laboratories, Inc., Chicago, Ill., a corporation of Illinois
No Drawing. Filed Dec. 21, 1962, Ser. No. 246,368
5 Claims. (Cl. 99—222)

The present invention relates to a salt composition, a portion of which is a strong alkaline agent having an edible cation. In particular, it relates to a mass of alkaline particles of which substantially all are of the same composition consisting essentially of sodium chloride and an alkaline agent selected from the group consisting of hydroxides and carbonates of alkali-metals having an edible cation which composition is useful in the processing of meat.

The greater advantages of the present invention lie in the alkali-metal hydroxide, and are explained by reference to an important use of the composition in treating meat, without any intent so to limit the use of the composition.

In processing meat, particularly whole meat or canned meat products which are cooked in containing molds or in sealed cans, there is a tendency for the meat to shrink and purge aqueous material which collects between the shrunken meat mass and the walls of the mold or can. To minimize this tendency one or more salts of phosphorus acids, such as pyrophosphoric, metaphosphoric and polyphosphoric acids, have been incorporated with the sodium chloride used in the processing, with or without curing salts. When curing salts are used it is also customary to include an ene-diol compound, such as an isomer of ascorbic acid or a water-soluble salt thereof. The ene-diol compound stabilizes the color of cured meat.

Fresh meat contains lactic acid which develops after slaughter, giving the meat a pH normally in the range from 5.5 to 6.2. The said salts of phosphorous acid are so chosen that they are effective to neutralize at least some of the lactic acid and elevate the pH toward pH of 7. This elevation of the pH increases the water-binding capacity of the meat, thus minimizing purging when cooked.

One disadvantage of the phosphates is that residual phosphate salt within the meat has an effect on the taste of the meat, thus limiting the amount that should be used. Another and related disadvantage is the migration of salt content from the meat to the surface on drying, as in the smokehouse, the migrated salt including the phosphate residues, thus imparting an undesirable surface taste and appearance. For example, in a case where 27 pounds of a phosphate is permitted by control authority, in 50 gallons of pickel to be used for pumping to 10% increased weight of the meat, the salting-out effect can be so great that not more than 16 pounds of the phosphate may be used.

The salts of phosphorus acids are mildly alkaline and may be mixed in solid or solution form with other salt ingredients for processing the meat. In solid form, they may be handled without danger to human skin. The present invention is based upon use of an oxide form of alkali, as distinguished from an alkaline salt. For example, an hydroxide of sodium or potassium may be substituted for the phosphorous acid salts, thereby eliminating the phosphorus acid salt residues.

The said hydroxides may not in all cases be used in the same manner as the salts of phosphorus acids. They are dusty when dry, irritating to humans, and dangerous in contacting the skin. They are also very hygroscopic on standing exposed. In curing meat with brine containing a water-soluble salt of an isomer of ascorbic acid, the said phosphate salts may be present in the brine, because of their mild alkalinity. Stronger alkalis such as the normal carbonates and hydroxides of sodium and potassium are incompatible in solution with such salt of an isomer of ascorbic acid, leading to the destruction of the latter, not instantaneously, but in such a short period of time that it is not possible to draw brine of constant composition from a supply tank thereof in commercial use of pickling brines.

When meat is injected with a pickle liquor, as in the arterial pumping of hams, or in the multiple-needle-impregnation of pork bellies, the liquor on entering the meat may contain incompatible ingredients, such as sodium ascorbate and sodium hydroxide, by combining two separate solutions in measured proportions substantially at the time of introducing the liquor to the meat. This may be done by combining two liquors just prior to entering a single-passage needle, or just prior to entering or within a manifold delivering to a bank of needles, such as are used for pork bellies. In so doing, one liquor may contain sodium ascorbate or its equivalent ene-diol compound, and the other may contain the strong alkali such as the carbonate or hydroxide, or both, of sodium or potassium. The alkali is neutralized by the meat before it has time to destroy the ene-diol compound. Carbonates function for the neutralization purposes mentioned, but in some cases are undesirable because generation of carbon dioxide forms pinholes in the meat. When the water or liquor in which the salt composition of the present invention is dissolved contains calcium impurities, such as calcium hard water, carbonate in the composition may precipitate calcium carbonate thus rendering the liquid undesirably turbid, but not impaired in function. Consequently, the hydroxides are preferred. Nevertheless, a small amount of carbonate may be used with an hydroxide without bubble-formation, and such a combination is advantageous with respect to the physical properties of the salt composition of the present invention.

The two liquors referred to are drawn from storage tanks, each containing stable liquor. These liquors are made by operators combining measured volumes of water with weighed amounts of supplied solid compositions. For example, one liquor may contain all the ingredients used for curing, such as sodium chloride, sodium nitrite, sodium nitrate, sodium isoascorbate, buffering agent, and any optional content of sugar or seasoning material, and the other may contain only sodium hydroxide. The latter requires weighing and handling with care sodium hydroxide per se, with consequent risk of danger. This is to be avoided in commercial establishments and in one way may be avoided by use of the salt composition of the present invention.

By combining a high proportion of salt with the alkali-metal hydroxide the supplied material is less dusty, less hygroscopic, less irritating, and more easily weighed, than is the case using an hydroxide per se. The total amount of sodium chloride for the cure may be used with the alkali or be divided between the two storage tanks in a proportion predetermined by the proportioning of the two streams in use, considering also predetermined compositions of the solid ingredients, and predetermined concentrations of said two liquors.

Certain government regulations limit use of various materials in processing meat. Where such regulations concern strong alkaline agents of the present invention, the potassium ion is preferred over the sodium ion when no other potassium ion is present, solely for the purpose of analysis, so that the content of potassium will be the measure of the alkali used, given the composition of the salt composition containing it, if a mixture of carbonate and hydroxide is used. For example, when only potassium hydroxide is used, knowledge of the salt composition containing it is not necessary. For this reason, a preferred salt composition is one consisting of sodium chloride and potassium hydroxide.

The salt composition of the present invention is produced by first providing a homogeneous mixture of fine particles of sodium chloride crystals and of the selected alkaline agent or agents. This mixture is then compacted by mechanical pressure into caked forms, sometimes with the adition of water to facilitate the compaction and to form strong cakes. Such cakes may be used to form the desired liquor. However, the trade demands a free-flowing granular mass. To meet this requirement, the caked forms, dried if necessary, are ground to a granular form of particle-size-distribution coarser than that of the original mixture. As a result, the particles are substantially all of the same composition, but each particle is an aggregate of homogeneous bodies of the separate ingredients.

By this process the dustiness of a supply of an hydroxide is overcome. The hydroxide locked into a body with sodium chloride is far less hygroscopic and much less irritating than the original hydroxide. The amount of hydroxide to be weighed for use is more accurately obtained by weighing a larger amount of the salt composition containing it.

Although it is preferred to use only the hydroxide as the alkaline agent, a portion of the alkaline agent may be supplied by use of a normal carbonate of sodium or potassium. When the composition is to be subjected to long standing in a humid environment, the hydroxide may exert its limited hygroscopicity with disadvantage. By including anhydrous alkali-metal carbonate which readily hydrates to dry crystals with water of crystallization, the hygroscopicity may be minimized.

Caking may be effected in one way by mechanically squeezing together the particles of the homogeneously mixed ingredients. This may be done by mechanically compressing the mixed crystals into sheet, cake, pellet, or briquette form. One way is to extrude a rod-like form and to chop off pellets as extruded. Another way is to pass a mass of the original crystals through the nip of heavy compression rolls, exerting heavy pressure, so that the sheet-like forms are produced of thickness, for example, $\frac{1}{16}$ to $\frac{1}{8}$-inch. Such forms may or may not be further fragmented to facilitate comintuion to a free-flowing granular mass.

The invention may be carried out with a wide variation in proportions. Since one objective is to dilute the alkaline material with sodium chloride for numerous reasons, there is a practical limit to the maximum content of alkaline material. For practical reasons, this is preferred to be 70 parts of the alkaline material to 30 parts of sodium chloride. Also, for practical purposes, the lower limit is 1 part of the alkaline material to 99 parts of sodium chloride.

Table I gives a suitable particle-size-distribution of the ingredients to be variously mixed and compacted for the present invention.

TABLE I

| Mesh | Percent by Weight of Fractions | | | | |
| --- | --- | --- | --- | --- | --- |
| | NaCl | Na₂CO₃ | NaOH | K₂CO₃ | KOH |
| Through 5 | | | 100 | | 100 |
| On 50 | 11.2 | 2.5 | 100 | 46 | 100 |
| On 100 | 76.2 | 16.0 | | 34 | |
| Through 100 | | | | 20 | |
| On 200 | 2.5 | 46 | | | |
| Through 200 | 10.1 | 34.5 | | | |

Mixtures of the above ingredients are made as follows:

TABLE II

| Example | Parts by Weight | |
| --- | --- | --- |
| | NaOH | NaCl |
| 1 | 10 | 90 |
| 2 | 20 | 80 |
| 3 | 25 | 75 |
| 4 | 30 | 70 |
| 5 | 35 | 65 |

Each mixture is compacted between heavy rolls using, for example, 9,000 lbs. pressure per inch of roll, thus forming cakes from $\frac{1}{16}$ to $\frac{1}{8}$-inch thick. The cakes are then ground to a particle-size-distribution such that all passes a 5-mesh screen and substantially all remains on a 50-mesh screen. Any finer material may be reprocessed by mixing into a subsequent batch to be compacted, or fed into a mill stream in a continuous system.

*Examples 1 to 5*

Liquors A–1 to A–5 are formed using water and 32.2 pounds of the NaCl–NaOH compositions of Examples 1 to 5 to make 50 gallons of liquor.

Liquor B in the amount of 50 gallons is formed using water, 1.6 pounds of sodium nitrite, 1.1 pounds of sodium nitrate, 1.5 pounds of sodium isoascorbate, and 1.5 pounds of sodium bicarbonate as buffering agent.

Hams having an initial pH of 6.1 are pumped by combining equal volumes of liquors A–1 to A–5 with Liquor B at the entrance to an injection needle to introduce in each instance combined liquor in amount of 10% on the weight of the pumped ham. After curing, the pH of the hams is given in Table III.

TABLE III

Combined liquor
using Example:                                pH of cured hams
1 ------------------------------------------ 6.3
2 ------------------------------------------ 6.4
3 ------------------------------------------ 6.5
4 ------------------------------------------ 6.6
5 ------------------------------------------ 6.7

From the foregoing it appears that the content of sodium hydroxide in Example 1 is near the minimum required for pickles containing about 35 pounds of solids per 100 gallons, when pumping hams to 10% added weight.

In comparing the results using alkali and not using alkali, paired hams were used, that is, the two hams of the same pig, one using the two streams as described above, and the other using a single liquor in which the content of sodium hydroxide is replaced by the same weight of sodium tripolyphosphate, which is commonly used in the art to minimize purging. In cooking, the limited extent of purging and the cured color were substantially the same, indicating equivalent results in neutralizing the lactic acid by sodium tripolyphosphate and sodium hydroxide.

Hydroxides of sodium and of potassium are commercially available in bulk and when exposed to the atmosphere become wet on top because of the hygroscopicity. By combining these with sodium chloride in the manner described, aggregates of the mixture become less hygroscopic than the hydroxides per se. This has been demonstrated with raw materials having particle-size distribution as follows:

| Material | Screen Mesh | Percent |
|---|---|---|
| Fine flake sodium chloride | On 50 | 8.1 |
| | On 80 | 59.7 |
| | On 100 | 17.5 |
| | Thru 100 | 14.7 |
| Flake sodium hydroxide | On 12 | 37.8 |
| | On 16 | 39.0 |
| | On 20 | 17.6 |
| | Thru 20 | 5.6 |
| Ground potassium hydroxide | On 50 | 9.1 |
| | On 100 | 19.2 |
| | On 200 | 40.3 |
| | Thru 200 | 31.4 |

The above materials were mixed in proportions given in Tables IV and V below, and the mixtures preserved dry in tightly capped bottles. Pellets of the mixtures were made just before exposure to the atmosphere. Pellets about 29 mm. in diameter and 5 mm. thick were formed from 5 grams of the mixture under a pressure of 5,000 pounds per sq. inch for 30 seconds. Two 5-gram pellets of each mixture were placed in a moisture dish 50 mm. in diameter and 27 mm. deep in which the pellets were weighed over a period of time exposed to a room environment. One pellet was placed flat and the other placed on edge against the side of the dish. The times of weighing, the atmospheric environment and percent increase in weight are given in Table IV for sodium hydroxide and in Table V for potassium hydroxide.

TABLE IV.—MOISTURE PICK-UP (PERCENT BY WEIGHT) OF PELLETS

| Weight, Time in Minutes | Temperature and relative humidity | Percent NaCl | | | |
|---|---|---|---|---|---|
| | | 90 | 75 | 65 | 50 |
| | | Percent NaOH | | | |
| | | 10 | 25 | 35 | 50 |
| 20 | 74.5° F.; 42% | 0.27 | 0.37 | [1] 0.47 | [1] 0.52 |
| 40 | | 0.56 | 0.77 | 0.98 | 1.04 |
| 80 | 80° F.; 32% | [2] 0.93 | [2] 1.40 | 1.74 | 1.92 |
| 100 | | 1.19 | 1.68 | 2.15 | [3] 2.37 |
| 120 | 80° F.; 31% | 1.28 | 1.95 | 2.60 | 2.78 |
| 140 | | 1.44 | 2.22 | 2.86 | 3.20 |
| 190 | 79° F.; 35% | 1.80 | 2.82 | 3.71 | 4.16 |
| 230 | | 2.09 | 3.31 | [1] 4.45 | 4.95 |
| 270 | 80.5° F.; 35% | [2] 2.39 | [2] 3.82 | [3] 5.22 | [3] 5.81 |

[1] Moisture droplets on pellet surface.
[2] Pellet appears dry.
[3] Pellet surface uniformly wet.

Table IV shows that the moisture pick-up increased with increased content of NaOH. It shows that with a content up to at least 25% the composition is substantially less hygroscopic than the compositions having upwardly from 35% NaOH.

*Sodium chloride — potassium hydroxide.* — Potassium hydroxide is well-known to be more hygroscopic than sodium hydroxide. Table V, similar to Table IV, shows that up to at least 25% content of potassium hydroxide, the composition is substantially non-hygroscopic.

TABLE V.—MOISTURE PICK-UP (PERCENT BY WEIGHT) OF PELLETS

| Weight, Time in Minutes | Temperature and relative humidity | Percent NaCl | | |
|---|---|---|---|---|
| | | 90 | 75 | 30 |
| | | Percent KOH | | |
| | | 10 | 25 | 70 |
| 20 | 72.5° F.; 42% | 0.55 | 0.68 | [1] 0.70 |
| 40 | | 0.91 | 1.20 | [2] 1.30 |
| 80 | 80° F.; 32% | [3] 1.43 | [3] 2.04 | 2.32 |
| 100 | | 1.67 | 2.43 | 2.80 |
| 120 | 80° F.; 31% | 1.91 | 2.82 | 3.32 |
| 160 | | 2.27 | 3.53 | 4.32 |
| 200 | 79° F.; 35% | [3] 2.66 | [3] 4.25 | 5.35 |
| 240 | | 3.00 | 4.94 | 6.40 |
| 270 | 80.5° F.; 35% | [3] 3.28 | [3] 5.46 | [2] 7.22 |

[1] Moisture droplets on pellet surface.
[2] Pellet surface uniformly wet.
[3] Pellet appears dry.

Although it is preferred to use an hydroxide as the only alkali, the composition is limited for compositions normally exposed to air, by the hygroscopicity and by the content of hydroxide. By including a normal carbonate, the alkali may be increased over an undesirably hygroscopic content. When a high content of alkali is desired, the carbonate may be used with from zero to non-hygroscopic content of the hydroxide.

Accordingly, the invention is to be considered broadly as a mass of aggregates of substantially the same composition, each having sodium chloride entities and entities of one or more of the described alkalis, as expressed in the appended claims.

We claim:

1. The method of producing an alkaline salt composition of substantially uniform content useful in treating meat, which comprises forming 100 parts by weight of an initial free-flowing fine-grained particulate mass which is substantially uniform in composition by combining from 30 to 99 parts of sodium chloride crystals and a remainder of alkaline particles, said alkaline particles being selected from the group consisting of alkali-metal hydroxides, alkali-metal normal carbonates, and mixtures thereof, any selected hydroxide constituting not more than 35 parts of said composition, compaction-bonding said mass to caked form by application of effective mechanical pressure to lock the hydroxide into a compaction-bonded body of sodium chloride crystals, and reducing the size of said caked forms to a granular mass coarser than said initial mass, whereby the particles of said granular mass are substantially all of the same composition.

2. The method of claim 1 in which the caked forms are reduced in size so that substantially all pass a 5-mesh screen and reside on a 50-mesh screen.

3. The method of claim 1 in which the alkaline particles consist of alkali-metal hydroxide.

4. The method of claim 1 in which the alkaline particles consist of those having only potassium cations.

5. The method of producing an alkaline salt composition of substantially uniform content useful in treating meat, which comprises forming in the presence of a small amount of water 100 parts by weight of an initial free-flowing particulate mass which is substantially uniform in composition by combining from 30 to 99 parts of sodium chloride crystals and a remainder of alkaline particles, said alkaline particles being selected from the group consisting of alkali-metal hydroxides, alkali-metal normal carbonates, and mixtures thereof, any selected hydroxide constituting not more than 35 parts of said composition, compaction-bonding said mass to caked forms by application of effective mechanical pressure to lock the alkaline particles into a compaction-bonded body of sodium chloride crystals, and reducing the size of the caked forms which are substantially dry so that substantially all pass a 5-mesh screen and reside on a 50-mesh screen, whereby the resulting particles are substantially all of the same composition.

References Cited by the Examiner

UNITED STATES PATENTS

| | | | |
|---|---|---|---|
| 2,054,624 | 9/1936 | Griffith | 99—159 X |
| 2,054,625 | 9/1936 | Griffith | 99—159 X |
| 2,400,292 | 5/1946 | Dalton. | |
| 2,770,548 | 11/1956 | Hall et al. | 99—159 X |
| 2,770,549 | 11/1956 | Hall | 99—159 X |
| 2,770,550 | 11/1956 | Hall et al. | 99—159 X |
| 2,770,551 | 11/1956 | Hall et al. | 99—159 X |
| 2,828,212 | 3/1958 | Sair | 99—159 X |
| 2,935,387 | 5/1960 | Phillips | 71—64 X |
| 2,977,214 | 3/1961 | McLellan | 71—64 |
| 3,098,767 | 7/1963 | Bush | 127—63 |

A. LOUIS MONACELL, *Primary Examiner.*

HYMAN LORD, *Examiner.*